United States Patent [19]

Thompson et al.

[11] Patent Number: 5,455,700
[45] Date of Patent: Oct. 3, 1995

[54] REGENERATIVE COMMUNICATION CHANNEL EXTENDER

[75] Inventors: Richard B. Thompson; Scott J. Nicolet, both of Round Rock, Tex.

[73] Assignee: Fisher Controls International, Inc., Clayton, Mo.

[21] Appl. No.: 876,653

[22] Filed: Apr. 30, 1992

[51] Int. Cl.$^6$ ............................ H04J 14/00; H04B 10/02; H04B 10/16
[52] U.S. Cl. ............................ 359/135; 359/137; 359/175; 359/179; 370/26; 370/85.13
[58] Field of Search ...................... 359/135–137, 359/173, 175, 179; 370/13.1, 26, 43, 85.13, 85.14

[56] References Cited

U.S. PATENT DOCUMENTS

| | | | |
|---|---|---|---|
| 4,761,832 | 8/1988 | Gade | 359/117 |
| 4,809,257 | 2/1989 | Gantenbein | 359/118 |
| 4,967,405 | 10/1990 | Upp | 359/135 |

*Primary Examiner*—Leslie Pascal
*Attorney, Agent, or Firm*—Arnold, White & Durkee

[57] ABSTRACT

A regenerative digital communication channel extender is provided which converts electrical signals in a first communication network into optical signals and then reconverts the optical signals back into electrical signals for application to a second communication network. The conversion is preferably performed using state machines. The communication in the first and second communication networks are preferably in a first protocol, whereas the optical communication is in a second protocol. The state machines convert the communications from the first protocol to the second protocol, and back from the second protocol into the first protocol. In the process, the communication in the first communication network is faithfully regenerated in the second communication network. In addition, a unique phase lock circuit is contemplated which requires only one pulse of an incoming digital communication to synchronize a local clock.

7 Claims, 7 Drawing Sheets

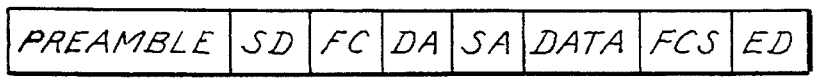
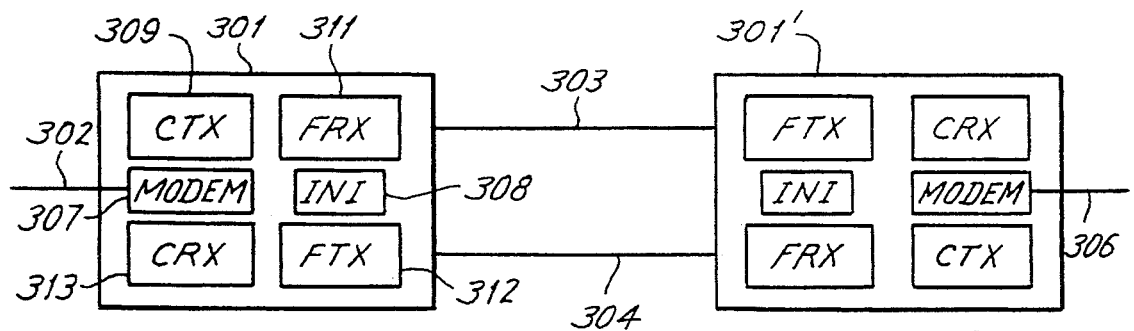
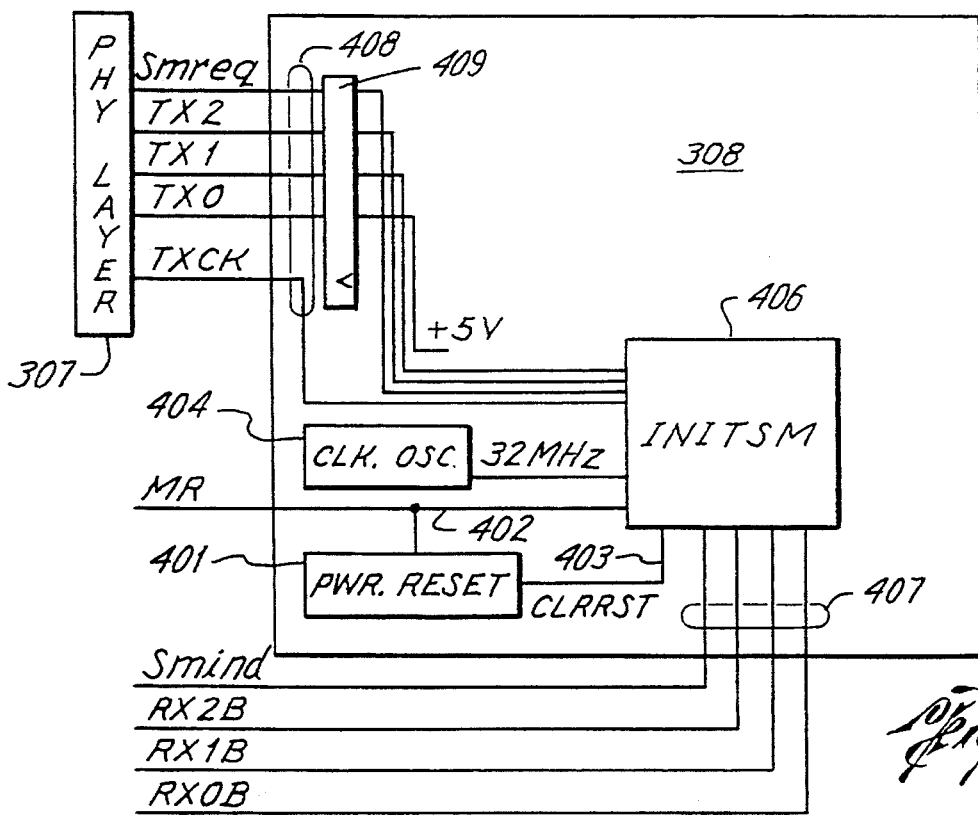

REGENERATIVE COMMUNICATION CHANNEL EXTENDER

TECHNICAL FIELD

The invention is directed to a regenerative extender for a communications channel such as, for example, a coaxial cable-based communication network.

BACKGROUND OF THE INVENTION

Common coaxial cable-based communication networks, for example, those applying the IEEE 802.4 communications standard, suffer from many drawbacks, including, for example, signal attenuation, tilt, group delay (also known as phase delay), jitter and slot time delay.

Signal attenuation affects the amplitude of the signal transmitted on a cable, and may affect the ability of a receiver to properly detect signals being transmitted on the cable. Tilt refers to the difference in amplitude between high frequency signals and low frequency signals due to higher attenuation of high frequency signals relative to low frequency signals. Group delay is a result of lower frequency signals travelling faster on cables than higher frequency signals. Group delay refers to the overlap of signals at a receiving end of the cable. Jitter refers to the timing uncertainty of the zero crossing of the received signal. Slot time delay is a parameter of a system that specifies the maximum time for a signal to be transmitted from any point in the system to another point and back again.

As cable communication networks grow larger, each of the above phenomena contribute to the degradation of transmitted signal integrity, thus increasing the likelihood of communication errors throughout the system. One known solution applied to extended cable-based communication networks is the use of so-called signal repeaters which are inserted at various points throughout the network. Such repeaters receive, amplify, and retransmit the signals being transmitted on the network. However, such repeaters are typically constructed from analog circuitry which, in many cases, actually exacerbates the problem of signal degradation. In addition, analog circuit-based signal repeaters can be susceptible to electromagnetic interference (EMI), and can suffer from drift due to aging and environmental sensitivity, all of which may introduce signal degradation. Microprocessor-based repeaters are also typically not acceptable because microprocessor program execution introduces unacceptable signal propagation delays through the repeater, thereby degrading the performance of cable-based communication network. Further, repeaters do not reconstruct transmitted signals, but simply amplify them along with any errors or anomalies in the signal. While simple signal amplification may correct for the affects of signal attenuation, it will not correct for tilt, group delay or jitter.

It would therefore be desirable to provide a repeater or network extender that combined the low propagation delay advantages of analog circuit-based repeaters with the accuracy of digital circuit-based repeaters without the disadvantages of either. It would also be desirable to provide a network extender that is capable of reconstructing a transmitted signal to correct for transmitted signal degradation.

SUMMARY OF THE INVENTION

The present invention avoids the above-noted problems of prior approaches by providing a regenerative communications channel extender which is constructed using state machine technology. In accordance with the present invention, an electrical signal is received from a transmission channel, such as a first coaxial cable, converted by a state machine into an optical signal and applied to an optical fiber. The signal is then received from the optical fiber and converted by another state machine back into an electrical signal for application to a second coaxial cable.

More specifically, the invention translates an electrical Frequency Shift Keying (FSK) signal into a Media Access Control (MAC) symbol entity. The MAC symbol entity is a parallel 3 bit code with a synchronized receive and transmit clock. The MAC symbol is serialized and transmitted over a fiber optic cable and is then received and reconstructed into a parallel MAC symbol. The reconstructed parallel MAC symbol is then translated back into an electrical FSK signal, and applied to a second coaxial cable. The present invention results in a received signal that is fully reconstructed thus eliminating the problems described above.

More particularly, the present invention is a regenerative digital communication path extender including a modem for receiving serial communication in a first communication protocol and for converting the serial communication into plural-bit parallel communication in a second protocol, a converter for converting the parallel communication into optical signals, an optical receiver for receiving optical signals and for converting the optical signals back into plural-bit parallel communication in the second protocol, and a signal regenerator, including a state machine, for regenerating the serial communication in the first protocol from the plural-bit parallel communication in the second protocol.

The invention also contemplates a communication network including the regenerative digital communication path extender.

In addition, the present invention contemplates a unique phase lock circuit which uses a clock signal generator which produces a number of clock signals, each of which has a different phase, a detector circuit for detecting a phase of an incoming serial digital communication, and a selecting circuit which is responsive to the detecting circuit and which selects the clock signal having the smallest phase difference from the incoming serial communication. In one embodiment, the selecting circuit includes a decoder which is activated by the detector, and which converts the plurality of clock signals into a selecting signal which controls a multiplexer, which, in turn, selects one of the plurality of clock signals. In addition, the plurality of clock signals can be generated by use of a local oscillator and a delay circuit which produces at least one clock signal delayed from the clock signal produced by the local oscillator.

These and other features and advantages of the present invention will become apparent to those of skill in this art with reference to the attached figures and following detailed description.

BRIEF DESCRIPTION OF THE DRAWINGS

FIG. 2 is a diagram of the data frame format used in the coaxial portion of the network of FIG. 1.

FIG. 3 is a more detailed block diagram of the regenerative extender of the present invention.

FIG. 4 is a block diagram of the initialization state machine in accordance with the present invention.

DETAILED DESCRIPTION

1. Glossary of Acronyms

Throughout this description, several different acronyms are used to describe signals and components. For convenience, a glossary of these acronyms is provided at the outset.

| Acronym | Meaning |
| --- | --- |
| BD | Bad Data |
| BDFL | Bad Data Flag |
| CBM | Carrierband modem |
| DCE | Data Communications Equipment |
| DELFIN | Delayed Fiber Data In Signal |
| DTE | Data Terminal Equipment |
| ED | End Delimiter |
| EDFL | End Delimiter Flag |
| ENC | Enable Counter |
| EXTCK | External Clock |
| FIFO | First In First Out |
| FORD | FIFO Output Ready Data |
| FRDSTR | Fiber Read Strobe |
| FRX | Fiber Receive Signal |
| FSK | Frequency Shift Keying |
| MAC | Media Access Control |
| MR | Master Reset |
| MUX | Multiplexer |
| NONSIL | Non Silence |
| OCT | Octet |
| OCTB | Octet Boundary Signal |
| PAL | Programmable Array Logic |
| PHY | Physical |
| RCFL | Read Control Flag |
| RVACT | Receiver Active |
| RXCK | Receive Clock |
| RXSYM or RX | Receive Symbol Signal |
| SD | Start Delimiter |
| SDFL | Start Delimiter Flag |
| SERCLK | Serial Clock |
| SM | State Machine |
| SMIND | Station Management Indicator |
| SMREQ | Station Management Request |
| TXACT | Transmit Active |
| TXCK | Transmit Clock |
| TXSYM or TX | Transmit Symbol Signal |

2. Description

Figure 1:
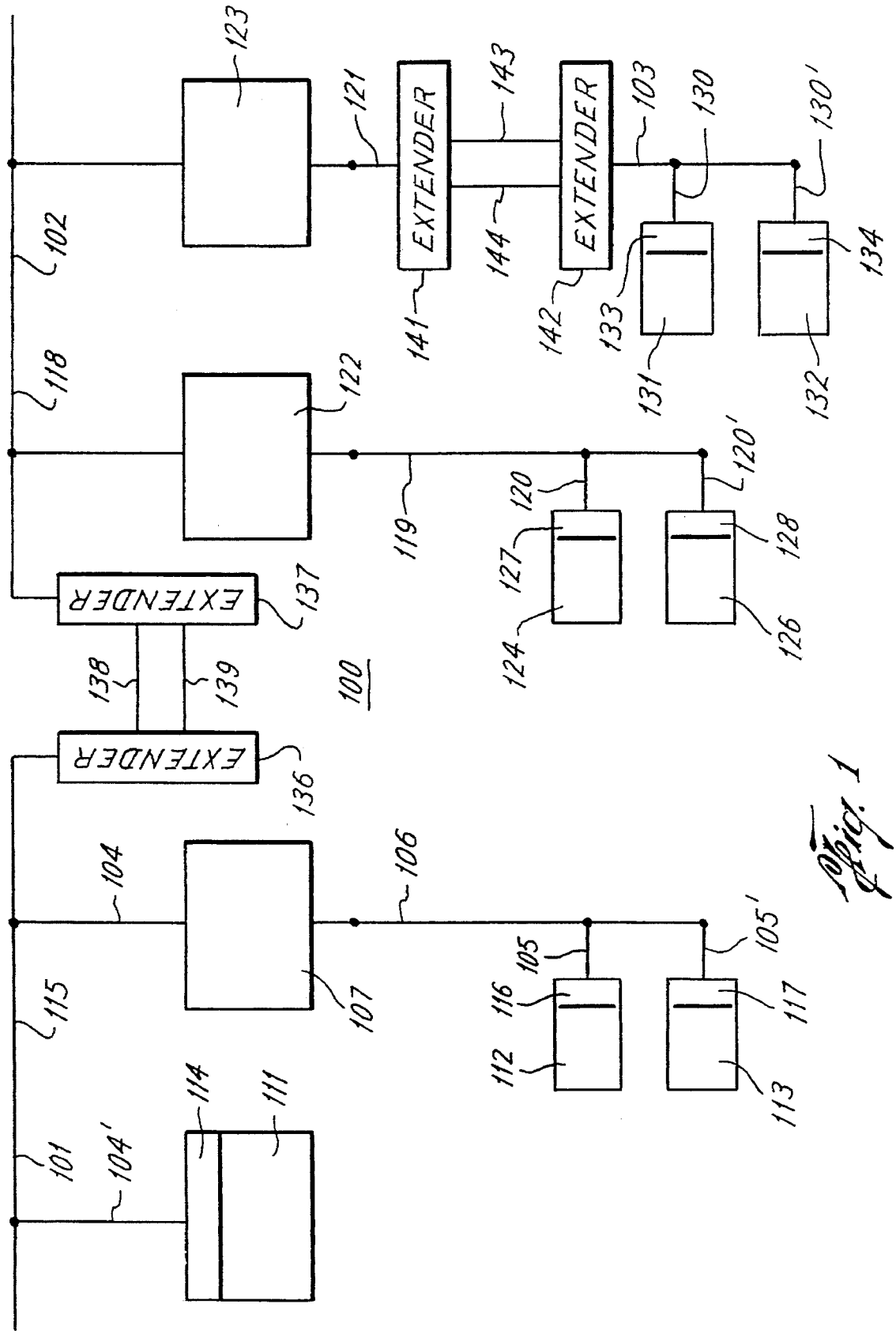
FIG. 1 is a block diagram of a communication network incorporating a regenerative extender, in accordance with the present invention.

Referring to FIG. 1, presented is a communication network 100 incorporating regenerative extenders, in accordance with the present invention. The communication network 100 includes first, second and third subnetworks 101, 102 and 103. Subnetworks 101, 102 and 103 can incorporate any type of communication channel, but are preferably coaxial-cable based networks employing the IEEE 802.4 communications standard for serial communications using Frequency Shift Keying (FSK).

Subnetwork 101 includes coaxial trunk cable 115 connected through isolation taps to first and second coaxial drop cables 104 and 104'. Subnetwork 101 also includes second coaxial trunk cable 106 connected to drop cable 104 through local data bridge 107. Isolation taps are well known in the art and are shown schematically in FIG. 1 with dots at intersecting lines. Also connected to subnetwork 101 are utilization devices 111, 112 and 113. Utilization device 111 is connected to coaxial drop cable 104' of subnetwork 101 through communications interface adapter 114. Similarly, utilization devices 112 and 113 are connected to coaxial trunk cable 106 of first subnetwork 101 through isolation taps, drop cables 105 and 105' and communication interface adapters 116 and 117.

Second subnetwork 102 is similarly configured to include coaxial trunk cables 118, 119 and 121. Coaxial trunk cable 118 is connected through an isolation tap and drop cable to coaxial trunk cable 119 through local data bridge 122. Similarly, coaxial trunk cable 118 is connected to coaxial trunk cable 121 through an isolation tap, drop cable and local data bridge 123. Utilization devices 124 and 126 are connected to coaxial trunk cable 119 through isolation taps, drop cables 120, 120' and communications interface adapters 127 and 128.

Third communications subnetwork 103 includes a coaxial trunk cable 129, to which are connected utilization devices 131 and 132 through isolation taps, drop cables 130 and 130' and communications interface adapters 133 and 134.

Utilization devices 111, 112, 113, 124, 126, 131 and 132 can be any type of apparatus which is capable of transmitting and/or receiving communications over communication network 100. For example, utilization devices 111, 112, 113, 124, 126, 131 and 132 can include digital processing apparatus, and various peripherals, and combinations thereof.

In practice, it is often necessary or desirable to locate utilization devices at very large distances from one another. For example, in a very large industrial plant in which computerized plant process controllers must communicate with one another, individual ones of the controllers may be several hundreds of meters apart. If a coaxial cable were used to connect the entire communication network 100, the great distances would likely result in unacceptable signal degradation and communication errors.

In accordance with the present invention, network 100 is extended by use of regenerative communication network extenders which employ fiber optic cables which, in combination, provide for the extension of a coaxial cable-based communication network. Within FIG. 1, coaxial drop cable 104 of communications subnetwork 101 is applied to extender 136. Similarly, coaxial trunk cable 118 of communications subnetwork 102 is applied to extender 137. Fiber optic cables 138 and 139 are connected between extenders 136 and 137. In a similar fashion, coaxial trunk cable 121 is connected to extender 141, while coaxial trunk cable 129 of communications subnetwork 103 is connected to extender 142. Fiber optic cables 143 and 144 are connected between extenders 141 and 142.

In practice, fiber optic cable pairs 138, 139 and 143, 144 can be thousands of meters in length, without significant signal degradation. In contrast, a purely coaxial cable-base network can only extend for several hundred meters before signal degradation results. Extenders 136, 137, 141 and 142 are all constructed substantially identically, and each is constructed using state machines which combine the speed and bandwidth of analog repeaters with the accuracy of microprocessor-based repeaters. Further, since fiber optic communication is substantially immune to electromagnetic interference, application of the present invention can result in a distributed network extending over several thousand (or tens of thousands of) meters, with minimal signal degradation.

As explained in more detail below, the present invention converts electrical signals which appear on coaxial cables 104, 106, 118, 119, 121 and 129 of communication network 100 of FIG. 1. These electrical signals are converted into optical signals in a serialized form of the Media Access Control (MAC) protocol, by extenders 136, 137, 141, and 142, and the applied to optical fibers 138, 139, 143 and 144. The extenders also convert optical signals in the serialized MAC protocol into FSK electrical signals for application to the coaxial cables.

FIG. 2 presents a frame format used in an IEEE 802.4 based communication network. The PREAMBLE pattern is used to set a receiving modem's clock and level, and includes one or more octets of information. The PREAMBLE is alternating 1's and 0's. SD is the Start Delimiter for the frame, and comprises one octet. FC is the Frame Control character, and also comprises one octet. DA is the Destination Address and comprises two or six octets. SA is the Source Address and also comprises two or six octets. DATA is the information of the frame and comprises zero or more octets. FCS is the Frame Check Sequence which comprises four octets, and ED is the End Delimiter for the frame, and comprises one octet.

Tables I–IV summarize the MAC symbols used in the present invention. Specifically, Table I includes the Transmit MAC symbols, Table II includes the Receive MAC symbols, Table III includes the Transmit Station Management MAC symbols, and Table IV includes the Receive Station Management MAC symbols. With Tables I–IV, an "X" signifies a "don't care" condition.

TABLE I

| TRANSMIT MAC SYMBOLS | | | |
|---|---|---|---|
| SYMBOL | TXSYM2 | TXSYM1 | TXSYM0 |
| DATA ZERO | 0 | 0 | 0 |
| DATA ONE | 0 | 0 | 1 |
| PAD-IDLE | 0 | 1 | X |
| NON-DATA | 1 | 0 | X |
| SILENCE | 1 | 1 | X |

TABLE II

| Receive MAC Symbols | | | |
|---|---|---|---|
| SYMBOL | RXSYM2 | RXSYM1 | RXSYM0 |
| DATA ZERO | 0 | 0 | 0 |
| DATA ONE | 0 | 0 | 1 |
| BAD-SIGNAL | 0 | 1 | X |
| NON-DATA | 1 | 0 | X |
| SILENCE | 1 | 1 | X |

TABLE III

| Transmit Station Management MAC Symbols | | | |
|---|---|---|---|
| SYMBOL | TXSYM2 | TXSYM1 | TXSYM0 |
| Serial Station Management Data Zero or Start Bit | 0 | 0 | 0 |
| Serial Station Management Data One or Stop bit or Idle | 0 | 0 | 1 |
| Enable Transmitter | 0 | 1 | 1 |
| Loopback Disable | 1 | 0 | 1 |
| Reset | 1 | 1 | 1 |

TABLE IV

| Receive Station Management MAC Symbols | | | |
|---|---|---|---|
| SYMBOL | RXSYM2 | RXSYM1 | RXSYM0 |
| Idle | 0 | 0 | 1 |
| Ack (Acknowledgement) | 0 | 1 | X |
| Nack (Non-Acknowledgement) | 1 | 0 | X |
| Physical Layer Error | 1 | 1 | 1 |

Referring now to FIG. 3, shown is a block diagram of a pair of regenerative extenders in accordance with the present invention. Connected to extender 301 is a first coaxial cable 302 upon which is carried FSK electrical signals, which can be, for example, in the IEEE 802.4 format. Extending between extenders 301 and 301' are first and second optical fibers 303 and 304. Optical fiber 303 is used to receive optically coded data within extender 301 which has been transmitted by extender 301', and optical fiber 304 carries optically coded data transmitted by extender 301 and received by extender 301'. Extender 301' is connected to coaxial cable 306 to transmit and receive FSK electrical signals. As mentioned above, extenders 301, 301' are substantially identical, and therefore only one extender 301 will be discussed in detail.

Within extender 301 is a modem 307 which is a commercially available modem such as, for example, the Motorola Carrierband Modem (CBM) module (MC68194) which implements IEEE 802.4 FSK signal receiving and transmitting. Modem 307 also provides physical layer management including local loopback, transmitter enable and reset.

Extender 301 also includes an initialization state machine 308 which, as explained in more detail below, initializes the elements of extender 301 when power is first applied. The details of initialization state machine 308 are discussed below and with reference to FIGS. 4 and 5.

Extender 301 also includes a coaxial transmitter (CTX) 309, a fiber receiver (FRX) 311, a fiber transmitter (FTX) 312, and a coaxial receiver (CRX) 313. FTX 312 and CRX 313 are shown in more detail with reference to FIG. 6. FRX 311 is shown in more detail with reference to FIGS. 7 and 7B, and CTX 309 is shown in more detail with reference to FIGS. 8, 9, 10 and 11.

Figure 5:
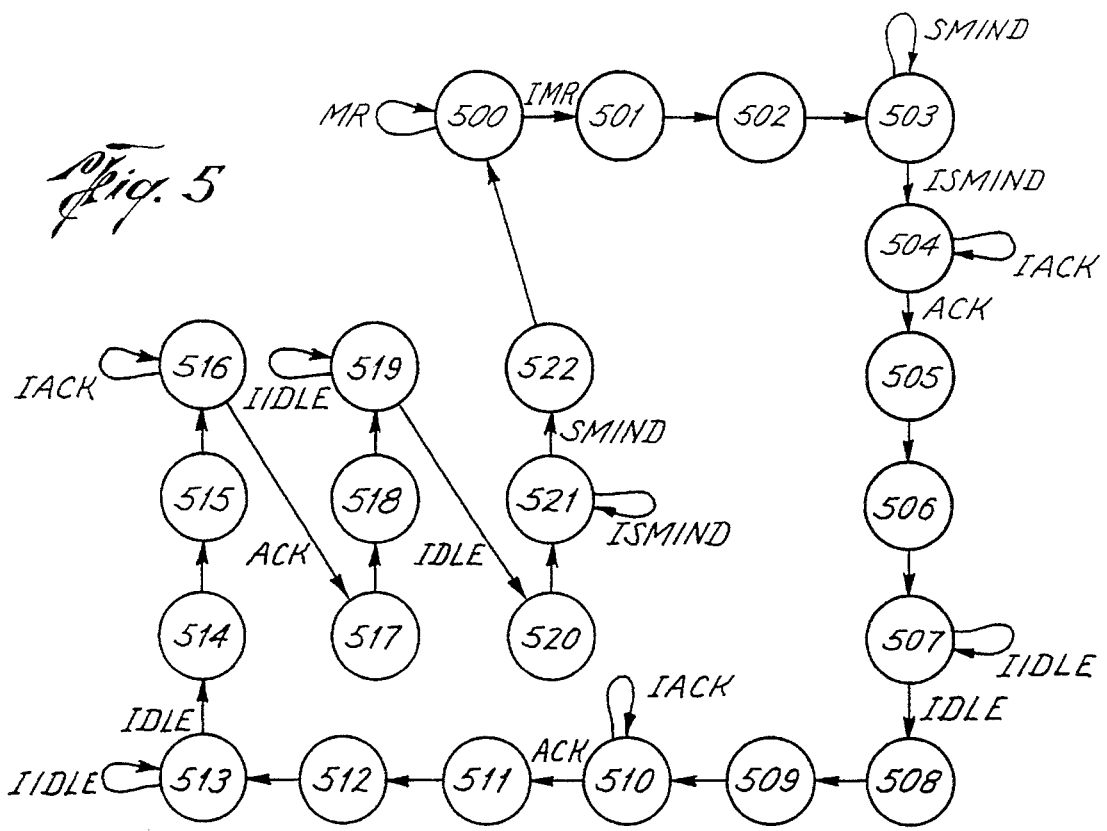
FIG. 5 is a state flow diagram of the initialization state machine of FIG. 4.

Referring now to FIG. 4, disclosed is a block diagram of the initialization state machine 308 which includes a power-on-reset (POR) circuit 401, which, in a known matter, produces a POR signal on line 402 used to start the initialization routine (shown in more detail in FIG. 5). In addition, POR circuit 401 holds the extender 301 in an inactive state through the Master Reset (MR) signal until a clear reset (CLRRST) signal is produced on line 403. Initialization state machine 308 also includes a clock circuit 404. At the heart of initialization state machine 308 is a programmable array logic (PAL) device 406 which is configured as a state machine, as shown in more detail in FIG. 5.

PAL 406, and all other PALs used in the invention can be, for example, type 22V10 PALs available from Advanced Micro Devices or from National Semiconductor.

PAL 406 initializes modem 307 (FIG. 3) by producing a predetermined initialization sequence on lines 408, which are connected to modem 307, and by detecting the proper responses on lines 407, which are also connected to modem 307. Buffer/latch 409 serves to buffer the MAC control signals for application to modem 307 through lines 408. The initialization sequence is specific for the particular type of modem used, and is specified by the modem manufacturer.

The signals on lines 408 follow the MAC symbol descriptions of Table III, and the signals appearing on lines 407 follow the MAC symbol descriptions appearing in Table IV.

Referring now to FIG. 5, the state flow of initialization state machine 407 is presented in more detail. Beginning in state 500, a POR signal produced by POR circuit 401 is awaited. Upon detection of POR, control is transferred to state 501 where MAC symbol TXSYM (TX2, TX1, TX0) is set to 11X, which corresponds to a reset of modem 307. Control then passes to state 502 where the SMREQ line is cleared low, which places modem 307 in the management mode.

Control then passes to state 503 where the SMIND signal is awaited to go low at which time control passes to state 504 where the RXSYM signals (RX2, RX1, RX0) are monitored for a 01X. Control then passes to state 505 where the TXSYM lines are set to 00X, which corresponds to an idle condition. Control then passes to state 506 which is a no op state. Then, in state 507, RXYSYM is monitored for a 00X. Control then passes to state 508 where TXSYM is set to 10X which disables the loopback of modem 307. Control then passes to state 509 which is no op state. Then in state 510, RXSYM is monitored for 01X. Control then passes to state 511 where TXSYM is set to 00X, which places modem 307 in an idle state. State 512 is a no op state, and state 513 waits until RXSYM is 00X. Control then passes to state 514 where TXSYM is set to 01X which enables modem 307 to transmit.

Control then passes to state 515 which is a no op state, and on to state 516 where the machine waits until RXSYM is 01X. Control then passes to state 517 where TXSYM is set to 00X which, once again, places modem 307 in the idle state.

Control then passes to state 518 which is a no op, and on to state 519 which waits until RXSYM is 00X at which time control passes to state 520 where SMREQ is set high. This places modem 307 in the MAC mode. In state 521, SMIND is monitored until it goes high, at which time control passes to state 522 where a CLRRST signal is produced on line 403, and control returns to state 500 until another POR is detected. As mentioned above, a CLRRST on line 403 causes POR circuit 401 to release the rest of extender 301 from the inactive state after initialization.

Figure 6:
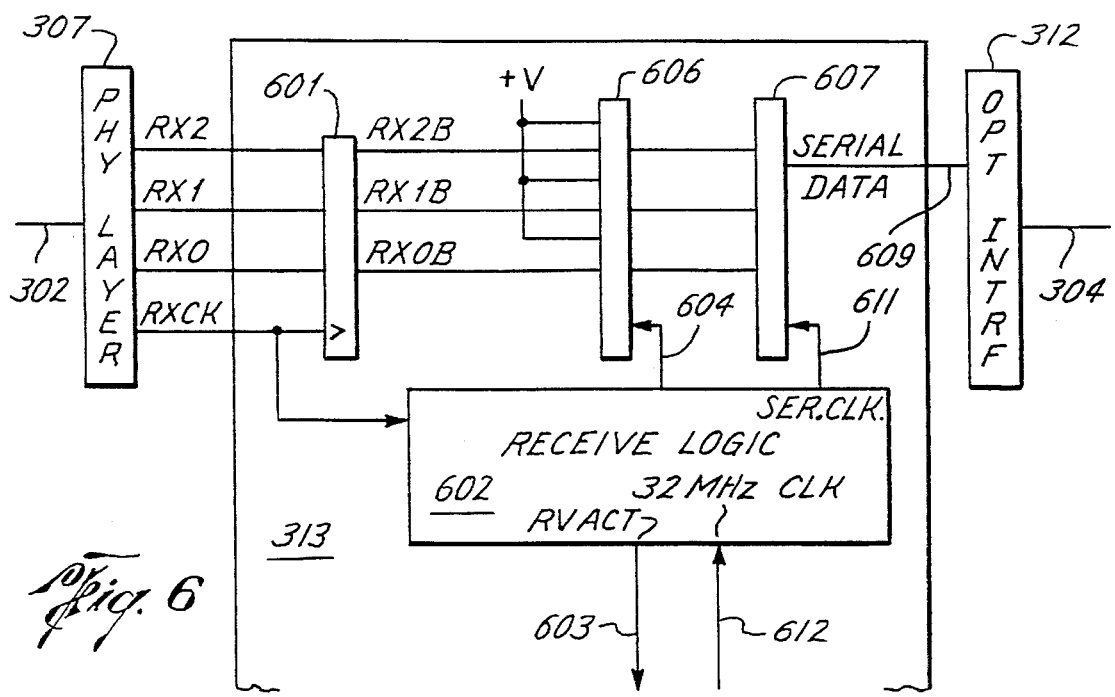
FIG. 6 is a block diagram of the coaxial receive logic in accordance with the present invention.

After extender 301 is initialized, it is ready to begin transmitting and receiving signals. Referring first to FIG. 6, presented is a block diagram of coaxial receiver CRX 313 and optical fiber transmitter FTX 312. After initialization, the MAC symbols in Tables I and II are used.

As mentioned above, after initialization, modem 307 receives serial data in the form of electrical signals, and converts the serial data into parallel MAC symbols (RXSYM2, RXSYM1 and RXSYM0) and a synchronized receive clock, RXCK. Receive clock RXCK clocks the three parallel MAC symbols into buffer 601. In addition, receive clock RXCK is applied to coaxial receive logic 602. Coaxial receive logic 602 produces several control signals responsive to application of receive clock RXCK. First, coaxial receive logic 602 produces a signal on line 603 indicating that the coaxial receiver is active. This is used elsewhere in extender 301. In addition, coaxial receive logic produces on line 604, a control signal which controls multiplexer 606 to apply one of two groups of 3-bit parallel signals to shift register 607. One of the groups of 3-bit parallel signals is a 111 which is provided through pull-up resistor 608 connected to voltage V. This corresponds to a MAC SILENCE symbol (see Table II). The other group of 3-bit parallel signals applied to multiplexer 606 are the MAC symbols received from modem 307 and stored in buffer 601.

The output of multiplexer 606 is applied to shift register 607 which operates, under control of coaxial receive logic 602, to produce a serial version of the 3 bits produced by multiplexer 606 on line 609. This is accomplished by coaxial receive logic 602 which produces on line 611, a series of 4 pulses. The first pulse is triggered by receive clock RXCK, and the following three pulses are timed by the external clock applied on line 612.

As a result, the 3-bit MAC symbol produced by modem 307 is serialized and applied to line 609, preceded by a synchronized clock signal. The resultant 4-bit serial electrical signal is applied to optical fiber transmitter FTX 312, which converts, in a known matter, the electrical signals line 609 into optical signals which are applied to optical fiber 304. After the 4 bits of data are transmitted on optical fiber 304, coaxial receive logic 602 resets itself, and resets the RVACT signal on line 603, and is thus ready to receive another 4-bit MAC symbol from modem 307.

Figure 7A:
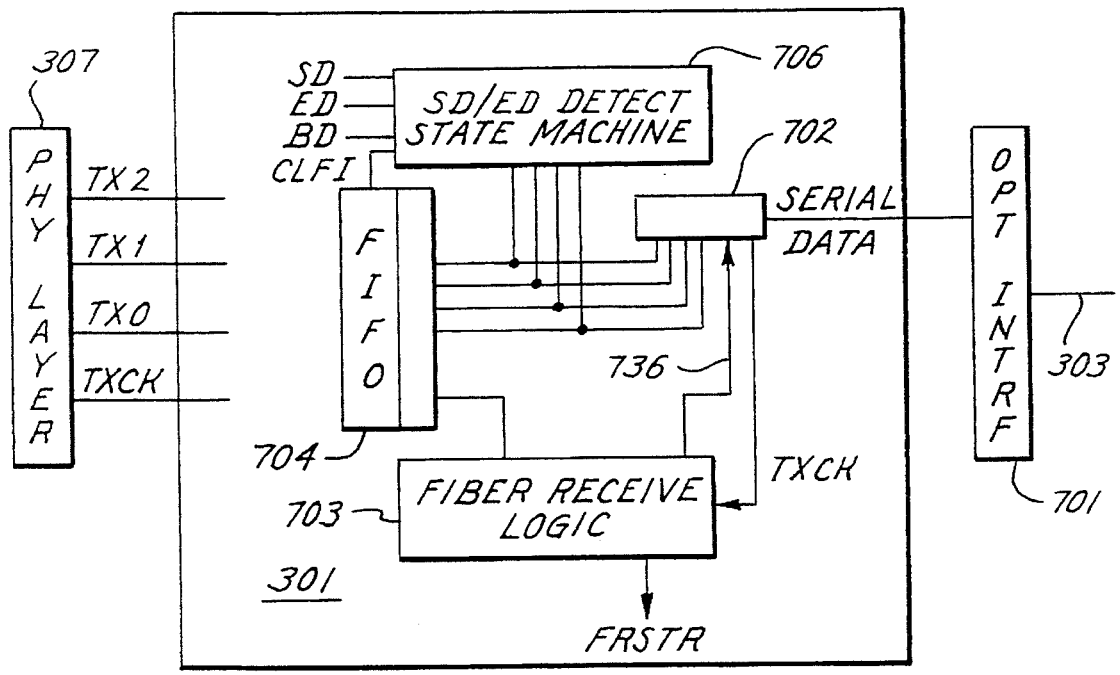
FIG. 7A is a block diagram of the fiber optic receive logic in accordance with the present invention.
Figure 7B:
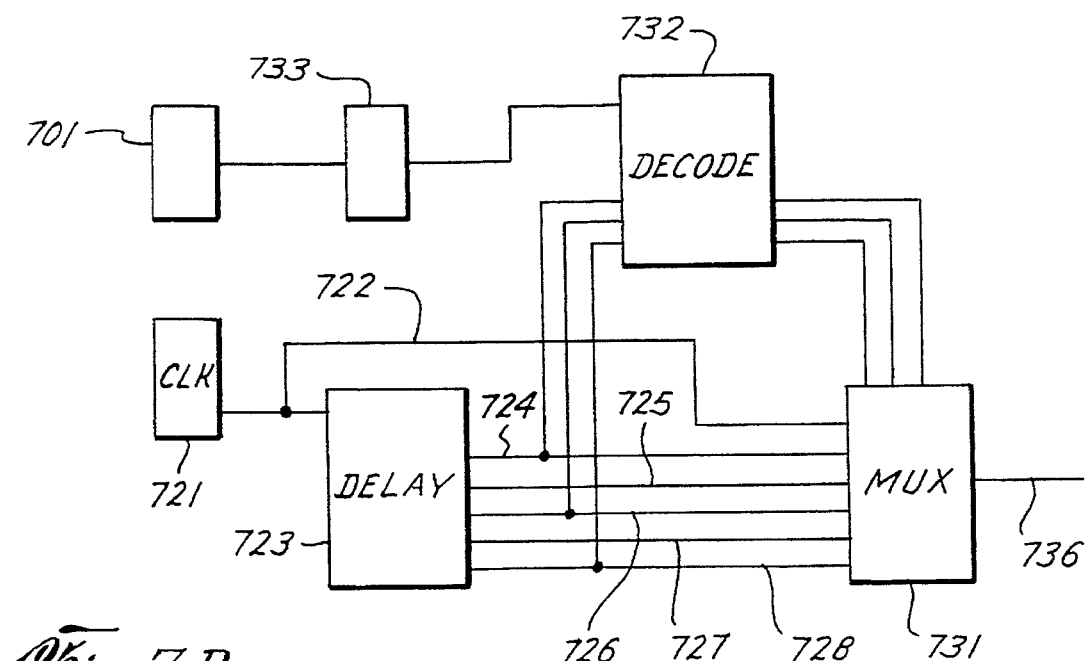
FIG. 7B is a schematic of the clock synchronization circuit used in FIG. 7.

Referring now to FIG. 7, presented is a block diagram of the optical fiber receiver FRX 311. Serial data is received in a known manner on optical fiber 303 by optical interface 701. Electrical signals indicative of the serial optical data appearing on optical fiber 303 are applied to the input of shift register 702. The first pulse of each 4-bit serial stream appearing at the input of shift register 702 is applied to fiber receive logic 703 which produces a 4-bit serial clock signal which is synchronized with the first pulse (transmit clock pulse TXCK) of the received 4-bit serial signal. Optical fiber receive logic 703 is presented below in more detail with respect to FIG. 7B.

Fiber receive logic 703 controls FIFO memory 704 to store the 3-bit MAC symbol stored in shift register 702. Thus, shift register 702 in combination with fiber receive logic 703 and FIFO 704 operate together to deserialize data appearing on fiber optic cable 303.

The information being stored into FIFO 304 from shift register 702 is detected by the Start Delimiter/End Delimiter (SD/ED) state machine 706, which is discussed in more detail with reference to FIG. 8. In addition, the information stored in FIFO 704 is converted into transmit MAC symbols for application to modem 307. This is also shown in more detail with reference to FIG. 8.

Referring now to FIG. 7B, presented in more detail is the circuitry of fiber receive logic 703. Clock crystal 721 produces a 32 MHz clock signal on line 722 which is applied to delay circuit 723. Delay circuit 723 produces on lines 724–728 the clock signal appearing on line 722 delayed in increments of 5 nanoseconds. In other words, line 724 is the clock signal on line 722 delayed by 5 nanoseconds, line 725 is the clock signal on line 722 delayed by 10 nanoseconds, line 726 is delayed by 15 nanoseconds, line 727 is delayed by 20 nanoseconds, and line 728 is delayed by 25 nanoseconds.

The period of the clock signal on line 722 (32 MHz) is approximately 31 nanoseconds. Thus, lines 722 and 724–728 provide six 32 MHz clock signals, the rising edges of which are separated by approximately 5 nanoseconds. These six clock signals are applied to multiplexer 731. In addition, the clock signals appearing on lines 724, 726 and 728 are applied to decoder 732. Three outputs of decoder 732 are applied as the select lines for multiplexer 731. The output of optical fiber receiver 701 is applied to D-type flip-flop 733 which detects and latches the rising edge of the TXCK bit of each 4-bit serial MAC symbol received by optical fiber receiver 701. The output of latch 733 is applied to decoder 732 which, at that instant, decodes the clock signals appearing on lines 724, 726 and 728 into a select code for multiplexer 731. The select code is held at the output of decoder 732 and is used to control multiplexer 731 to select one of the six clock signals on lines 722 and 724–728 for application to clock line 736. Clock line 736 is then used to control shift register 702 to synchronously clock the 3-bit MAC symbol immediately following the TXCK signal latched by latch 733.

In other words, fiber receive lock logic 703 operates to select one of the six clock signals appearing on lines 722 and 724–728 that is closest in phase to the phase of the TXCK bit received by optical fiber receiver 701. Thus, fiber receive logic 703 operates much like a phase lock loop detector to synchronize the receiver (shift register 702) to the data repetition frequency of the received signal. However, unlike known phase lock loops, which require several clock cycles to synchronize the receiver with the incoming data, the present invention requires only one received pulse to render the receiver substantially synchronous with the data rate of the received signal.

After the 3-bit MAC symbol is synchronously clocked into shift register 702, fiber receive logic 703 is reset to await the receipt of the next transmit clock TXCK which leads the next 3-bit serialized MAC symbol.

Figure 8:
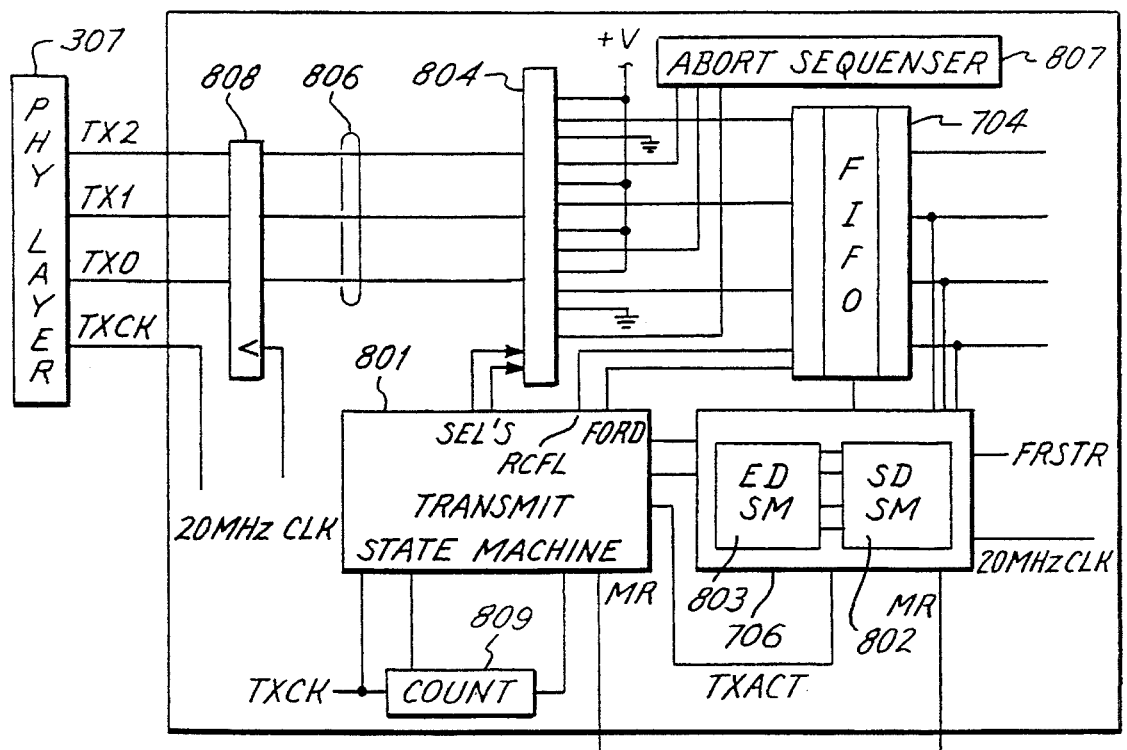
FIG. 8 is a block diagram of the transmit state machine in accordance with the present invention.

Referring now to FIG. 8, presented is the detail of the cable transmitter CTX 309 of the present invention. CTX 309 includes two state machines, a Transmit State Machine 801 and a Start Delimiter/End Delimiter (SD/ED) state machine 706. SD/ED state machine 706 is configured as two separate state machines, a SD state machine 802 and an ED state machine 803.

Figure 10:
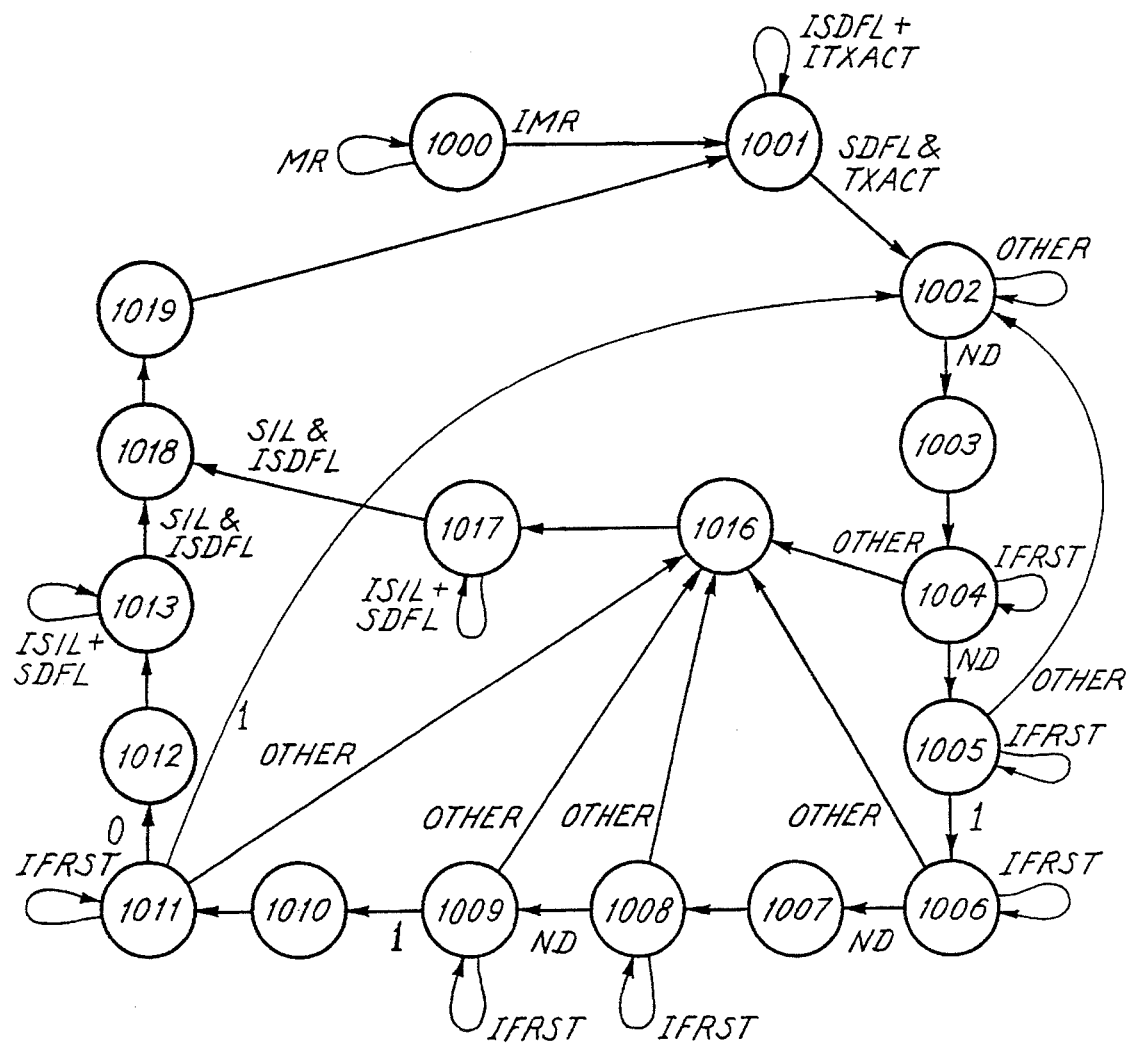
FIG. 10 is a state flow diagram of the end delimiter state machine portion of FIG. 8.
Figure 11:
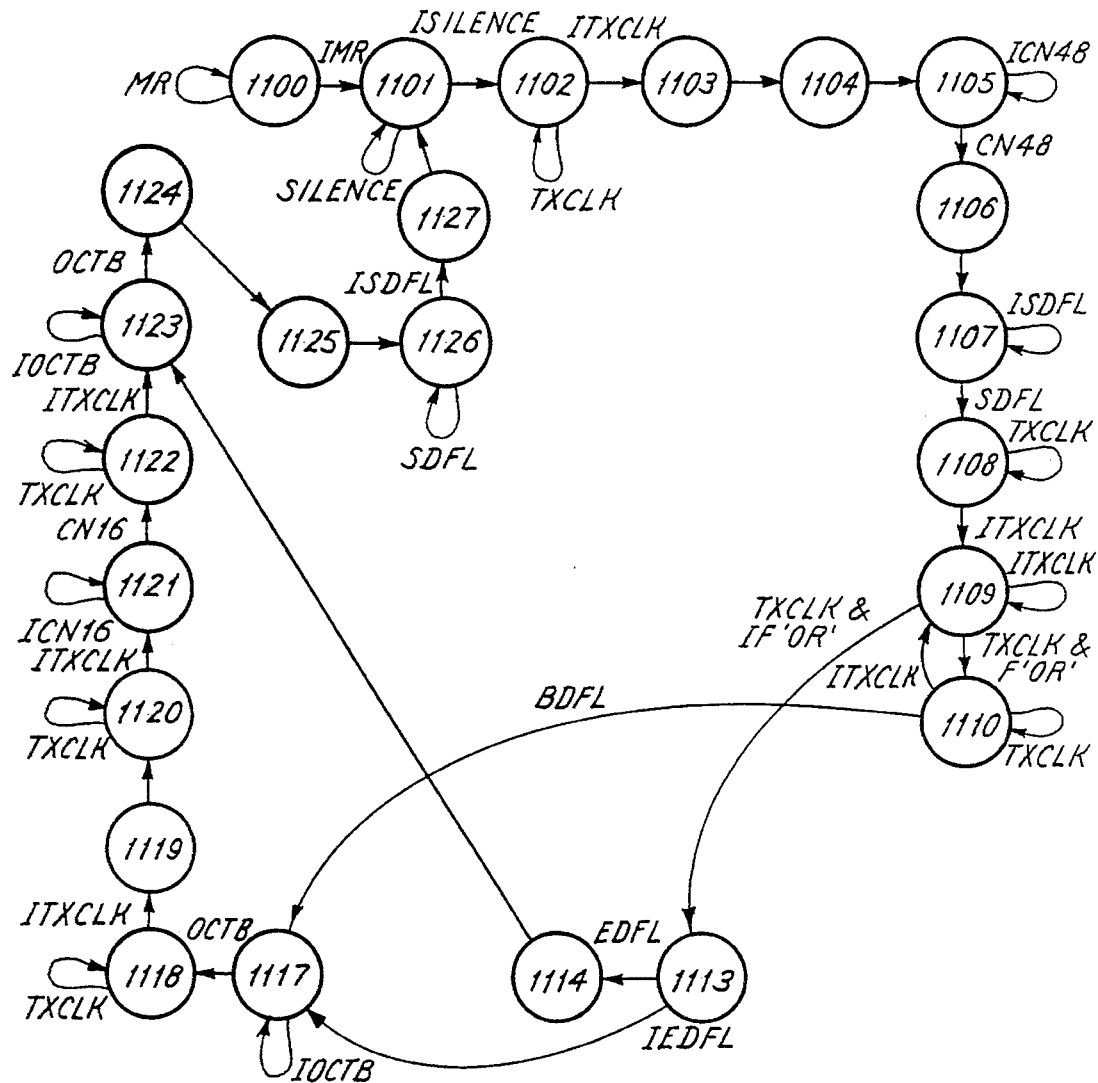
FIG. 11 is a state flow diagram of the transmit state machine portion of FIG. 8.

The state flow of Transmit State Machine 801 is shown in more detail below with reference to FIG. 11, and the state flow of SD state machine and ED state machine are discussed below in more detail with reference to FIGS. 9 and 10, respectively. In practice, the state flow diagrams of FIGS. 9, 10 and 11 are used to program PALs to create the state machines.

Transmit State Machine 801 operates to control multiplexer 804 to select one of four groups of inputs for application to lines 806. The first group of inputs is a SILENCE MAC symbol, provided by pullup resistors. The second group of inputs is the data stored in FIFO 704. The third group of inputs is a PADIDLE symbol, which is used by modem 307 to create a preamble, and the last group of data is an abort sequence produced by abort sequencer 807. SD State Machine 802 is dedicated to the detection of a Start Delimiter, and ED state machine 803 is dedicated to the detection of an End Delimiter.

The 3-bit MAC symbol selected by multiplexer 804 is applied to latch 808 for application to modem 307 which, as described earlier, converts the MAC symbols into serial data in IEEE 802.4 format for application to a coaxial cable.

Figure 9:
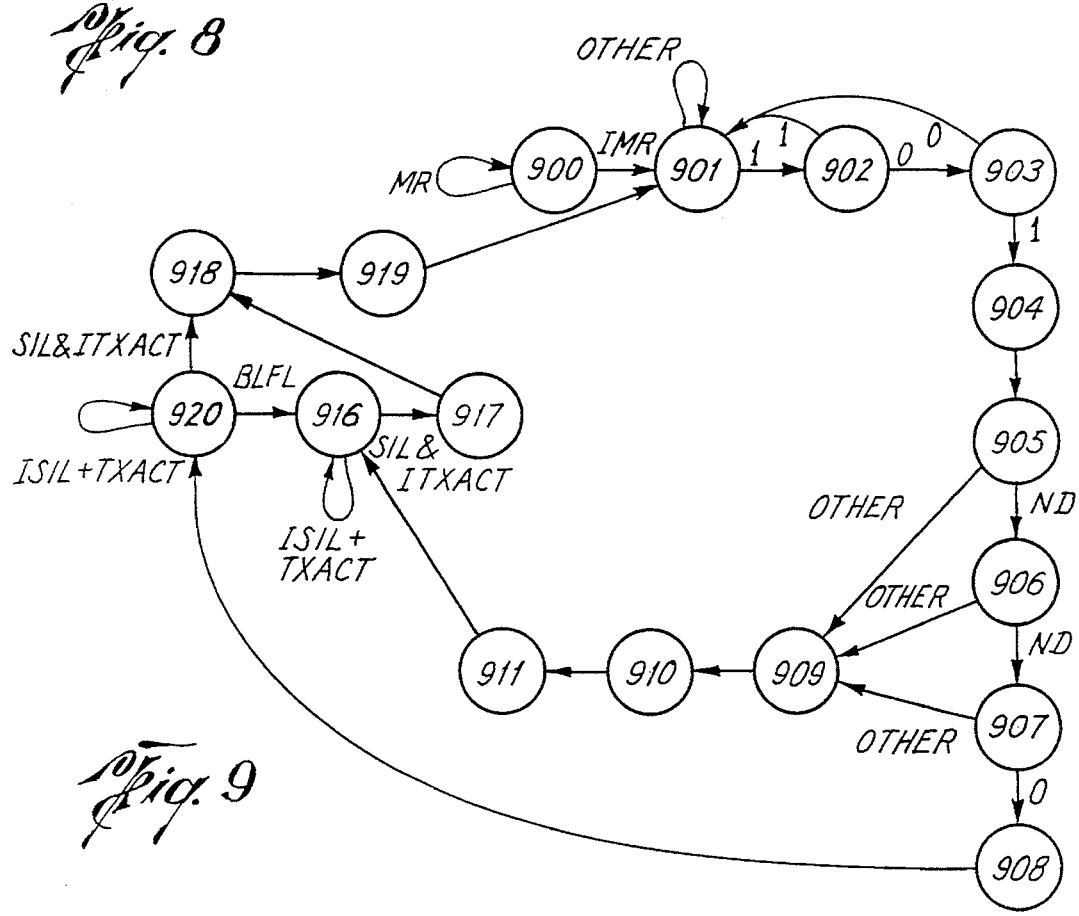
FIG. 9 is a state flow diagram of the start delimiter state machine portion of FIG. 8.

Referring to FIG. 9, presented is the state flow diagram of the Start Delimiter (SD) state machine 802 used in FIG. 8. Beginning in state 900, the generation of master reset MR (produced by intitializing state machine 406 (FIG. 4)), is awaited. Upon detection of MR, control passes to states 901, 902 and 903 where the detection of a PREAMBLE signal is done. Specifically, in block 901, the 3-bit word stored in FIFO 704 is detected to determine whether it is 001. If so, control passes to state 902, otherwise, control remains in state 901. In state 902, the next 3-bit word in FIFO 704 is detected to determine whether it is 000. If so, control passes to state 903, otherwise, control returns to state 901. In state 903, the next 3-bit word in FIFO 704 is tested to determine whether it is 001. If so, control passes to state 904, if not, control returns to state 901. Thus, only when a proper PREAMBLE is detected by states 901, 902 and 903 (which is defined as the sequence 001 000 001 in the first three positions of FIFO 704), does control pass to state 904. If any other sequence is detected, control remains within states 901, 902 and 903. In state 904, the NONSIL signal is set, indicating lack of silence, and control passes to state 905. In states 905, 906 and 907, the detection of the Start Delimiter SD is performed. (In IEEE 802.4 format, the SD begins with ND, ND, 0 which, in MAC symbols is 10X, 10X, 000.)

In state 905, the FIFO 704 is tested to determine whether the first character (10X) of SD is present. If so, control passes to state 906. In state 906, FIFO 704 is again tested to determine whether the second character (10X) of SD is present. If so, control passes to state 907 where FIFO 704 is tested to determine whether the third character (000) of SD is present. If so, control passes to state 908 where the Start Delimiter Flag, SDFL is set.

If any of states 905, 906 or 907 determines that other than the proper SD character is present in FIFO 704, an error condition exists, and control passes to state 909. In state 909, the FIFO clear signal, CLRFI is set, which clears FIFO 704. Control then passes to state 910 where the Start Delimiter Flag SDFL is set. Control then passes to state 911, which is a no op state. States 912, 913, 914 and 915 are all no op states, and are therefore not shown in FIG. 9. In state 916, FIFO 704 is tested for a 11X, indicating silence, at the same time when the TXACT signal is low. Control then passes to state 917 where the CLRFI signal is cleared. Then in state 918, the SDFL is cleared.

If state 918 is entered, indicating that SD has properly been detected, control passes to state 920 where FIFO 704 is tested for the silence indicator (11X) when fiber read strobe FRDSTR is high and when the TXACT signal is low. If in state 920, the bad data flag, BDFL is detected, control passes to state 16. From state 918, control passes to state 919 which is a no op state, and from state 919 back to state 900.

Referring now to FIG. 10, presented is the state flow diagram for the End Delimiter state machine 803, used in FIG. 8. In practice, ED state machine 803 is a PAL which is programmed to accomplish the state flow shown in FIG. 10.

Beginning in state 1000, the master reset signal, MR, is awaited. Upon receipt, control passes to state 1001 where the start delimiter flag, SDFL and transmit active flag TXACT, are tested until both are true. When this occurs, control passes to state 1002. In state 1002, the inputs to FIFO 704 are tested for a 100X signal when the fiber read strobe FRSTR is high. Only when this condition is satisfied is control passed to state 1003, which is a no op state.

States 1004 through 1011 function as the End Delimiter. Only upon successful detection of the End Delimiter is control passed to state 1012 where the End Delimiter Flag, EDFL is set.

More specifically, beginning in state 1004, the data lines leading to FIFO 704 are tested for a 110X when the FRSTR is high. If this condition is satisfied, control passes to state 1005, otherwise, if other codes are present when FRSTR is high, control passes to state 1016.

In state 1005, the lines leading to FIFO 704 are tested for a 1001 when FRSTR is high. If this condition is satisfied, control passes to state 1006. On the other hand, if other codes are present when FRSTR is high, control passes back to state 1002.

In state 1006, the lines leading to FIFO 704 are tested for a 110X signal when FRSTR is high. When this condition is satisfied, control passes to state 1007, which is a no op state. If other codes are detected when FRSTR is high, control passes to state 1016.

In state 1008, the lines leading to FIFO 704 are tested for a 110X signal when FRSTR is high, in which case control passes to state 1009. If other codes are detected in state 1008, control passes to state 1016.

In state 1009, the lines leading to FIFO 704 are tested for a 1001 when FRSTR is high, in which case control passes to state 1010, which is a no op state. If other codes are detected in state 1009, control passes to state 1016.

In state 1011, the lines leading to FIFO 704 are detected for a 1000 signal when FRSTR is high, in which case control passes to state 1012. On the other hand, if either a 110X, 101X, or 111X signal is detected when FRSTR is high, control passes to state 1016. Finally, within state 1011, if a 1001 signal is detected when FRSTR is high, control returns to state 2.

As mentioned above, state 1012 sets End Delimiter Flag, EDFL, before transferring control to state 1013. In state 1013, the lines leading to FIFO 704 are tested for a 111X signal when FRSTR is high and SDFL is low. When this condition is satisfied, control passes to state 1018.

States 1014 and 1015 are both no op states, and are not shown in FIG. 10.

Entry into state 1016 is indicative of an error in the received data, and therefore in state 1016, the Bad Data Flag, BDFL is set. Control then passes to state 1017 where the lines leading to FIFO 704 are tested for a 111X signal when FRSTR is high and the SDFL flag is low.

In state 1018, both the BDFL and EDFL flags are cleared, and control is passed to state 1019, which is no op state. Control then returns to state 1001.

Referring now to FIG. 11, the state flow of the Transmit State Machine 801 of FIG. 8 is presented. In practice, Transmit State Machine 801 is a PAL device programmed according to the state flow diagram shown in FIG. 11.

Beginning in state 1100, the MR signal is awaited, and when received, control passes to state 1101. In state 1101, the nonsilence flag, NONSIL is tested until it is set, at which time octet counter 809 is cleared and control is passed to state 1102. In state 1102, the transmit clock, TXCK is tested until it goes low, at which time the select lines for multiplexer 804 are set to select the PADIDLE signal group for application to lines 806. In addition, the Transmit Active Flag, TXACT, is set.

Control then passes to state 1103 where octet counter 809 is again cleared. In state 1104, counter 809 is enabled, and control passes to state 105 where a count of 48 in counter 809 is awaited (corresponding to six octets). Control then passes to state 1106 where counter 809 is again cleared.

Control then passes to state 1107 where SDFL is awaited. When SDFL is received, counter 809 is disabled, and control passes to state 1108.

In state 1108, TXCK is tested until it goes low, at which time the select lines of multiplexer 804 are set to select the data from FIFO 704 for application to lines 806. In addition, the Octet Boundary flag, OCTB, is set.

Control then passes to state 1109 where the transmit TXCK is tested until it goes high, at which time the FORD signal is tested. If true, control passes to state 1110, and if false, control passes to state 1113. In addition, the RCFL signal is set high when TXCK is high.

In state 1110, if TXCK is low, control returns to state 1109 unless the BDFL flag is also set, in which case control passes to state 17. In addition, RC is set low when TXCK is low.

States 1111 and 1112 are no op states, and are not shown in FIG. 11.

In state 1113, the EDFL flag is tested, and if true, control passes to state 1114, otherwise, control passes to state 1117. In state 1114, if TXCK is low, control passes to state 1123. In addition, the select lines of multiplexer 804 are set to select the group of signals indicating the SILENCE signal. States 1115 and 1116 are no op states, and are not shown in FIG. 11.

In state 1117, the octet boundary flag (produced by octet counter 809) is awaited, and when true, control passes to state 1118. In state 1118, TXCK is sensed until it goes low, at which time, the select lines of multiplexer of 804 are set so that the abort sequence (a SD followed immediately by an ED), produced by abort sequencer 807, is applied to lines 806.

Control then passes to state 1119, which is a no op state. Then, in state 1120, TXCK is sensed until it goes low, at which time octet counter 809 is enabled. Then, in state 1121, a count of 16 (two octets) is awaited, at which time control passes to state 1122, where, upon detection of TXCK being low, the select lines for multiplexer 804 are set so that the SILENCE symbol is applied to lines 806.

Control then passes to state 1123 where the OCTB Flag is awaited, at which time octet counter 809 is disabled. Control then passes to state 1124 where counter 809 is cleared. Then, in state 1125, TXACT and OCTB are both cleared. Control then passes to state 1126 to wait for SDFL to clear. Control then passes to state 1127, which is a no op state, and then back to state 1101.

Although the present invention has been described with respect to a single preferred embodiment, it will be understood by those of skill in the art that additions, deletions, and changes can be made to the disclosed embodiment, without departing from the spirit and scope of the claimed invention.

What is claimed is:

1. A communication network comprising:
   at least first and second communication subnetworks, each subnetwork including at least one serial communication path carrying digital communication in a message format using a first encoding format;
   a communication network extender for connecting a predetermined serial communication path in said first subnetwork with a predetermined serial communication path in said second subnetwork, comprising:

a first converter for converting a set of signals on said predetermined serial communication path in said first subnetwork into optical signals in said message format using a second encoding format;

an optical communication path for carrying said optical signals between said first and second subnetworks;

a second converter, including a state machine, for regenerating said set of signals from said optical signals to produce a regenerated set of signals in said message format using said first encoding format; and means for applying said regenerated set of signals to said predetermined serial communication path in said second subnetwork.

2. The communication network as recited in claim 1, wherein said first converter includes a state machine.

3. The communication network as recited in claim 1, said second converter further including:

an error detector for detecting errors in said message format; and an abort sequence generator, responsive to said error detector, for generating an abort sequence for application to said predetermined serial communication path in said second subnetwork when said error detector detects an error.

4. The communication network as recited in claim 1, said communication network extender further comprising:

a preamble generator for generating a message preamble for application to said predetermined serial communication path in said second subnetwork before application of said regenerated set of signals.

5. A regenerative digital communication path extender comprising:

a modem for receiving serial communication in a message format in a first encoding format, and for converting said serial communication into plural-bit parallel communication in said message format in a second encoding format;

a converter for converting said parallel communication into serial optical signals;

an optical receiver for receiving serial optical signals and for converting said serial optical signals into plural-bit parallel communication in said message format in said second encoding format; and means, including a state machine, for regenerating said serial communication in said message format in said first encoding format from said plural-bit parallel communication in said message format in said second encoding format.

6. The regenerative digital communication path extender as recited in claim 5, said means for regenerating further including:

an error detector for detecting errors in said message format; and an abort sequence generator, responsive to said error detector, for generating an abort sequence in response to detection of errors in said message format.

7. A regenerative digital communication path extender as recited in claim 5, said second converter further including:

a preamble generator for generating a message preamble before regeneration of said serial communication.

* * * * *